(12) United States Patent
Furusawa et al.

(10) Patent No.: US 9,373,858 B2
(45) Date of Patent: Jun. 21, 2016

(54) METHOD FOR STARTING FUEL CELL SYSTEM AND STARTING APPARATUS FOR FUEL CELL SYSTEM

(71) Applicant: HONDA MOTOR CO., LTD., Tokyo (JP)

(72) Inventors: Koichiro Furusawa, Wako (JP); Nobutaka Nakajima, Wako (JP); Kaoru Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 600 days.

(21) Appl. No.: 13/744,418

(22) Filed: Jan. 18, 2013

(65) Prior Publication Data

US 2013/0209908 A1    Aug. 15, 2013

(30) Foreign Application Priority Data

Feb. 13, 2012  (JP) .................................. 2012-028756

(51) Int. Cl.
*H01M 8/04*   (2006.01)

(52) U.S. Cl.
CPC ...... *H01M 8/04231* (2013.01); *H01M 8/04089* (2013.01); *H01M 8/04097* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 6,436,562 B1 * | 8/2002 | DuBose | ............ | H01M 8/04014 429/408 |
| 2009/0104480 A1 * | 4/2009 | Machuca | .......... | H01M 8/04089 429/429 |

FOREIGN PATENT DOCUMENTS

| | | | |
|---|---|---|---|
| JP | 4357836 B2 | | 7/2004 |
| JP | 2008-21485 | * | 1/2008 |
| WO | WO 02/058168 A2 | | 7/2002 |

OTHER PUBLICATIONS

Japanese Office Action for corresponding JP Application No. 2012-028756, Oct. 6, 2015 (w/ English machine translation).

* cited by examiner

*Primary Examiner* — Jonathan Crepeau

(74) *Attorney, Agent, or Firm* — Mori & Ward, LLP

(57) ABSTRACT

In a method for starting a fuel cell system, an oxidizer gas bypass passage is operated by an oxidizer gas bypass passage controller to supply oxidizer gas to a diluter from an oxidizer gas supply device under a condition where an oxidizer gas supply passage is sealed by an oxidizer gas supply passage sealing device and an oxidizer exhaust gas exhaust passage is sealed by an oxidizer exhaust gas exhaust passage sealing device. A fuel exhaust gas recirculation passage is operated by a fuel exhaust gas recirculation passage controller to supply fuel gas to the fuel cell from a fuel gas supply device.

9 Claims, 3 Drawing Sheets

US 9,373,858 B2

METHOD FOR STARTING FUEL CELL SYSTEM AND STARTING APPARATUS FOR FUEL CELL SYSTEM

CROSS-REFERENCE TO RELATED APPLICATIONS

The present application claims priority under 35 U.S.C. §119 to Japanese Patent Application No. 2012-028756, filed Feb. 13, 2012, entitled "Method and Apparatus for Starting Fuel Cell System." The contents of this application are incorporated herein by reference in their entirety.

BACKGROUND OF THE INVENTION

1. Field of the Invention

The present disclosure relates to a method for starting a fuel cell system and a starting apparatus for the fuel cell system.

2. Discussion of the Background

Fuel cells produce direct-current energy by an electrochemical reaction between fuel gas (gas mainly containing hydrogen, for example, hydrogen gas) supplied to an anode electrode, and oxidizer gas (gas mainly containing oxygen, for example, air) supplied to a cathode electrode.

Examples of known fuel cells include solid polymer electrolyte fuel cells. The solid polymer electrolyte fuel cells each include a membrane electrode assembly (MEA) including an anode electrode and a cathode electrode which are provided on both sides of an electrolyte membrane composed of a polymer ion-exchange membrane, the MEA being interposed between a pair of separators. A fuel gas flow passage is formed between one of the separators and the membrane electrode assembly in order to supply fuel gas to the anode electrode, and an oxidizer gas flow passage is formed between the other separator and the membrane electrode assembly in order to supply oxidizer gas to the cathode electrode.

During shutdown of a fuel cell, the fuel cell is in a state in which the supply of the fuel gas and the oxidizer gas is stopped, but the fuel gas remains in the fuel gas flow passage of the fuel cell, and the oxidizer gas remains in the oxidizer gas flow passage of the fuel cell. Therefore, in particular, when the shutdown period of the fuel cell is increased, the remaining fuel gas and oxidizer gas permeate through the electrolyte membrane and degrade an electrode catalyst and a catalyst support, and thus the life of the fuel cell may be decreased.

Accordingly, for example, a fuel cell apparatus (fuel cell system) disclosed in Japanese Patent No. 4357836 is configured to be shut down in a state in which an anode flow passage is completely filled with air by supplying air to the anode flow passage from a blower during shutdown of the fuel cell apparatus (refer to paragraph [0021] of Japanese Patent No. 4357836).

Also, the fuel cell apparatus disclosed in Japanese Patent No. 4357836 is configured to purge the air remaining in the anode flow passage during shutdown of the fuel cell apparatus by supplying hydrogen to the anode flow passage at the time of start of the fuel cell apparatus. After purging of the air in the anode flow passage is completed, air is supplied to a cathode flow passage (refer to claim 1 of Japanese Patent No. 4357836).

SUMMARY OF THE INVENTION

According to one aspect of the present invention, in a method for starting a fuel cell system, an oxidizer gas bypass passage is operated by an oxidizer gas bypass passage controller to supply oxidizer gas to a diluter from an oxidizer gas supply device under a condition where an oxidizer gas supply passage is sealed by an oxidizer gas supply passage sealing device and an oxidizer exhaust gas exhaust passage is sealed by an oxidizer exhaust gas exhaust passage sealing device. The oxidizer gas bypass passage is branched from the oxidizer gas supply passage and connected to the oxidizer exhaust gas exhaust passage to bypass a fuel cell. The fuel cell is provided to generate electric power by an electrochemical reaction between fuel gas supplied to an anode side and oxidizer gas supplied to a cathode side. The oxidizer gas supply device is provided to supply the oxidizer gas to the fuel cell through an oxidizer gas supply passage. The oxidizer gas bypass passage controller is configured to control an operating state of the oxidizer gas bypass passage. The oxidizer gas supply passage sealing device is provided to seal the oxidizer gas supply passage downstream of a branch portion where the oxidizer gas bypass passage is branched from the oxidizer gas supply passage. The oxidizer exhaust gas exhaust passage sealing device is provided to seal the oxidizer exhaust gas exhaust passage upstream of a connection portion where the oxidizer gas bypass passage is connected to the oxidizer exhaust gas exhaust passage. The diluter is provided to connect a downstream side of a fuel exhaust gas exhaust passage to a downstream side of the oxidizer exhaust gas exhaust passage. In the method, a fuel exhaust gas recirculation passage is operated by a fuel exhaust gas recirculation passage controller to supply fuel gas to the fuel cell from a fuel gas supply device. The fuel exhaust gas recirculation passage controller is configured to control an operating state of the fuel exhaust gas recirculation passage. The fuel gas supply device is provided to supply the fuel gas to the fuel cell through the fuel gas supply passage. In the method, a fuel exhaust gas exhaust passage is operated by a fuel exhaust gas exhaust passage controller to exhaust an anode residual gas remaining on the anode side of the fuel cell into the diluter and to replace anode-side gas in the fuel cell with the fuel gas. The fuel exhaust gas exhaust passage controller is configured to control an operating state of the fuel exhaust gas exhaust passage through which fuel exhaust gas is to be exhausted from the fuel cell.

According to another aspect of the present invention, a starting apparatus for a fuel cell system includes a first device, a second device, a third device, and a fourth device. The first device is configured to operate an oxidizer gas supply passage sealing device to seal an oxidizer gas supply passage through which oxidizer gas is to be supplied to a fuel cell. The first device is configured to operate an oxidizer exhaust gas exhaust passage sealing device to seal an oxidizer exhaust gas exhaust passage through which the oxidizer gas is to be exhausted from the fuel cell. The second device is configured to operate, in a sealed state, an oxidizer gas bypass passage controller to supply the oxidizer gas to a diluter from an oxidizer gas supply device through an oxidizer gas bypass passage which is branched from the oxidizer gas supply passage and which is connected to the oxidizer exhaust gas exhaust passage to bypass the fuel cell. The third device is configured to operate a fuel gas supply device to supply fuel gas to the fuel cell and configured to operate a fuel exhaust gas recirculation passage controller to supply fuel exhaust gas, which is exhausted from the fuel cell through a fuel exhaust gas exhaust passage, to the fuel cell through a fuel exhaust gas recirculation passage. The fourth device is configured to operate a fuel exhaust gas exhaust passage controller to exhaust anode residual gas, which contains the fuel gas and remains on an anode side of the fuel cell, to the diluter through the fuel exhaust gas exhaust passage and to replace anode-side gas in the fuel cell with the fuel gas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
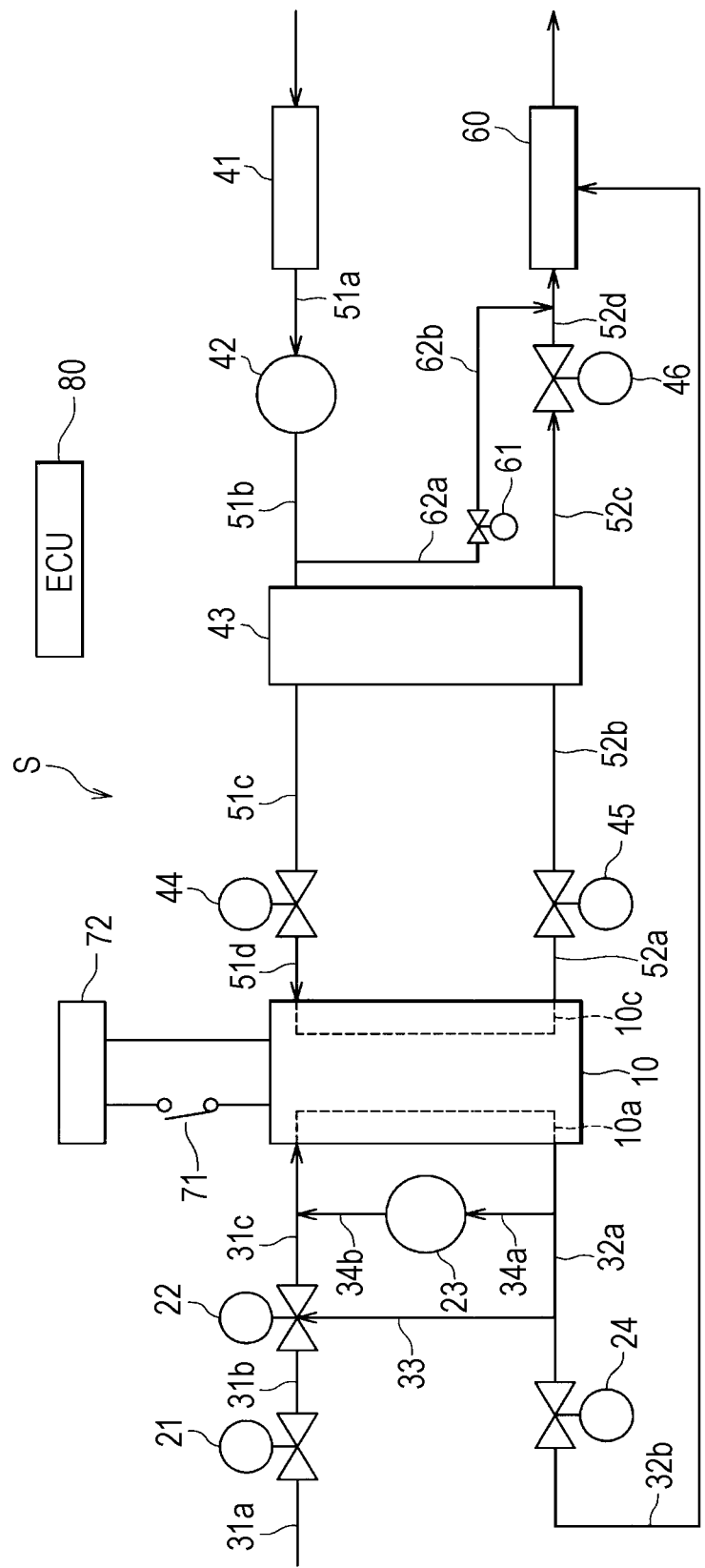
FIG. 1 is a block diagram of a fuel cell system according to an embodiment of the present application.

The embodiments will now be described with reference to the accompanying drawings, wherein like reference numerals designate corresponding or identical elements throughout the various drawings.

In the drawings, a common portion is denoted by the same reference numeral, and duplicated description is omitted.

<<Fuel Cell System>>

First, a configuration of a fuel cell system S in which a starting process according to an embodiment is performed is described with reference to FIG. 1.

The fuel cell system S shown in FIG. 1 is mounted on, for example, a fuel cell vehicle (movable body) not shown in the drawing.

The fuel cell system S is provided with a fuel cell stack 10 (fuel cell), an anode system that supplies and discharges hydrogen (fuel gas) to and from an anode of the fuel cell stack 10, a cathode system that supplies and discharges air (oxidizer gas) containing oxygen to and from a cathode of the fuel cell stack 10, a dilution exhaust system that exhausts fuel exhaust gas from the anode system and oxidizer exhaust gas from the cathode to the outside of the fuel cell system S, a power supply system connected to an output terminal (not shown) of the fuel cell stack 10 to supply electric power generated by the fuel cell stack 10 to a load, and an electronic control unit (ECU) 80 serving as a controller that electronically controls these systems. The specified types of the fuel gas and the oxidizer gas are not limited to the above.

<Fuel Cell Stack>

The fuel cell stack 10 includes a plurality (for example, several tens to several hundreds) of stacked solid polymer single cells (fuel cells) which are connected in series. Each of the single cells includes a membrane electrode assembly (MEA) and two conductive separators which hold the MEA therebetween. The MEA includes an electrolyte membrane (solid polymer membrane) composed of a monovalent cation exchange membrane and an anode and a cathode (electrodes) which hold the electrolyte membrane therebetween.

The anode and the cathode each include a porous material having conductivity, such as carbon paper, and a catalyst (Pt, Ru, or the like) carried on the porous material in order to produce an electrode reaction on the anode or the cathode.

Each of the separators has a groove formed for supplying hydrogen or air to the entire surface of the MEA and a through hole formed for supplying and exhausting hydrogen or air to and from all single cells, the groove and the through hole functioning as an anode flow passage 10a (fuel gas flow passage) and a cathode flow passage 10c (oxidizer gas flow passage). The anode flow passage 10a and the cathode flow passage 10c have a plurality of branches and junctions in order to supply the hydrogen and air to whole surface of the single cells, and the sectional area of the flow passages is minimized.

When hydrogen is supplied to each anode through the anode flow passage 10a, an electrode reaction represented by formula (1) takes place, and when air is supplied to each cathode through the cathode flow passage 10c, an electrode reaction represented by formula (2) takes place, producing a potential difference (open circuit voltage) in each single cell. Next, when the fuel cell stack 10 is electrically connected to a load 72 described below to draw out a current, electric power is generated from the fuel cell stack 10.

$$2H_2 \rightarrow 4H^+ + 4e^- \qquad (1)$$

$$O_2 + 4H^+ + 4e^- \rightarrow 2H_2O \qquad (2)$$

When electric power is generated from the fuel cell stack 10 as described above, water (water vapor) is produced on the cathode, and thus the oxidizer exhaust gas exhausted from the cathode flow passage 10c contains much moisture.

<Anode System>

The anode system includes a hydrogen tank (not shown), a cutoff valve 21, an ejector 22, a hydrogen pump 23, and an anode purge valve 24.

A fuel gas supply passage is formed to be connected from the hydrogen tank (not shown) to the inlet of the anode flow passage 10a through a pipe 31a, the cutoff valve 21, a pipe 31b, the ejector 22, and a pipe 31c. Consequently, hydrogen (fuel gas) in the hydrogen tank is supplied to the anode flow passage 10a through the fuel gas supply passage (the pipe 31a, the cutoff valve 21, the pipe 31b, the ejector 22, and the pipe 31c).

The cutoff valve 21 is a normally closed-type cutoff valve which is controlled to be opened and closed by the ECU 80. The ECU 80 opens the cutoff valve 21 when the fuel cell system S is operated (when electric power is generated by the fuel cell stack 10).

The ejector 22 ejects the hydrogen (fuel gas) from the hydrogen tank (not shown) through a nozzle to generate negative pressure which causes fuel exhaust gas in a pipe 33 to be sucked. In addition, the ejector 22 is controlled to be opened and closed by the ECU 80.

The outlet of the anode flow passage 10a is connected to the intake port of the ejector 23 through a pipe 32a and the pipe 33. The exhaust gas exhausted from the anode flow passage 10a is directed to the ejector 22 through the pipe 32a and the pipe 33 so that the fuel exhaust gas (hydrogen) is circulated.

The fuel exhaust gas contains hydrogen remaining unconsumed by the electrode reaction on the anode and water vapor. In addition, the pipe 33 is provided with a gas-liquid separator (not shown) which separates between and recovers water (condensed water (liquid) and water vapor (gas) contained in the fuel exhaust gas.

In addition, a pipe 34a branched from the pipe 32a connected to the output of the anode flow passage 10a is connected to a suction port of the hydrogen pump 23. A discharge port of the hydrogen pump 23 is connected to the pipe 31c through a pipe 34b, thereby forming a fuel exhaust gas recirculation passage connected from the outlet of the anode flow passage 10a to the inlet of the anode flow passage 10a through the pipe 32a, the pipe 34a, the hydrogen pump 23, the pipe 34b, and the pipe 31c.

The operation of the hydrogen pump 23 is controlled by the ECU 80 so as to compress the fuel exhaust gas from the pipe 32a and pump it to the pipe 31c.

The pipe 32a is connected to a diluter 60 described below through the anode purge valve 24 and a pipe 32b to form a fuel exhaust gas exhaust passage.

The anode purge valve 24 is a normally closed-type valve which is controlled to be opened and closed by the ECU 80. When it is determined that power generation of the fuel cell stack 10 is unstable during the operation of the fuel cell system S, the ECU 80 opens the anode purge valve 24 for a predetermined valve opening time.

<Cathode System>

The cathode system includes an intake 41, an air pump 42, a humidifier 43, an inlet sealing valve 44, an outlet sealing valve 45, and CPCV (Cathode Purge Control Valve) 46.

An oxidizer gas supply passage is formed to be connected from the intake 41, that takes in the outside air, to the inlet of the cathode flow passage 10c through a pipe 51a, the air pump 42, a pipe 51b, the humidifier 43, a pipe 51c, the inlet sealing valve 44, and a pipe 51d. As a result, the air (oxidizer gas) taken in from the intake 41 is supplied to the cathode flow passage 10c through the oxidizer gas supply passage (the pipe 51a, the air pump 42, the pipe 51b, the humidifier 43, the pipe 51c, the inlet sealing valve 44, and the pipe 51d).

The operation of the air pump 42 is controlled by the ECU 80 so as to compress the air from the pipe 51a and pump it to the pipe 51b.

The humidifier 43 is provided with a plurality of hollow fiber membranes (not shown) having moisture permeability. The humidifier 43 exchanges moisture between the air (air flowing from the pipe 51c to the pipe 51d) directed to the cathode flow passage 10c and the humid oxidizer exhaust gas (oxidizer exhaust gas flowing from the pipe 52b to the pipe 52c) exhausted from the cathode flow passage 10c, thereby humidifying the air flowing to the cathode flow passage 10c.

The inlet sealing valve 44 is controlled to be opened and closed by the ECU 80.

The outlet of the cathode flow passage 10c is connected to the diluter 60 described below through the pipe 52a, the outlet sealing valve 45, the pipe 52b, the humidifier 43, the pipe 52c, the CPCV 46, and a pipe 52d, forming an oxidizer exhaust gas exhaust passage.

The outlet sealing valve 45 is controlled to be opened and closed by the ECU 80.

The CPCV 46 includes, for example, a butterfly valve whose degree of opening is controlled by the ECU 80 to control the pressure of air in the cathode flow passage 10c. In detail, as the degree of opening of the CPCV 46 decreases, the pressure of air in the cathode flow passage 10c increases, and the oxygen concentration (volume concentration) per volume flow rate increases. Conversely, as the degree of opening of the CPCV 46 increases, the pressure of air in the cathode flow passage 10c decreases, and the oxygen concentration (volume concentration) per volume flow rate decreases.

<Dilution Exhaust System>

The dilution exhaust system includes the diluter 60 and a bypass valve 61.

The pipe 51b connected to the discharge port of the air pump 42 is connected to the diluter 60 through a pipe 62a, the bypass valve 61, a pipe 62b, and the pipe 52d, forming an oxidizer gas bypass passage. That is, the air may be sent to the diluter 60 from the air pump 42 while bypassing the cathode flow passage 10c of the fuel cell stack 10.

The bypass valve 61 is a normally closed-type cutoff valve and is controlled to be opened and closed by the ECU 80.

The diluter 60 is capable of diluting the fuel exhaust gas from the pipe 32b in the fuel exhaust gas exhaust passage with the oxidizer exhaust gas from the pipe 52d in the oxidizer exhaust gas exhaust passage or the air supplied from the open bypass valve 61.

<Power Supply System>

The power supply system is connected to an output terminal (not shown) of the fuel cell stack 10 and provided with a contactor 71 etc. to supply the generated power of the fuel cell stack 10 to a load 72.

The contactor 71 is capable of cutting off connection between the output terminal (not shown) of the fuel cell stack 10 and the load 72 and is controlled by the ECU 80.

<ECU>

The ECU 80 is a controller that electronically controls the fuel cell system S and includes CPU (Central Processing Unit), ROM (Read-Only Memory), RAM (Random-Access Memory), various interfaces, an electronic circuit, etc. According to a program stored in the ECU 80, various functions are exhibited to control various devices such as the cutoff valve 21, the ejector 22, the hydrogen pump 23, the anode purge valve 24, the air pump 42, the input sealing valve 44, the outlet sealing valve 45, the CPCV 46, the bypass valve 61, the contactor 71, etc.

In addition, various sensors are provided in the fuel cell system S so that detected signals are transmitted to the ECU 80.

<<Starting Process for Fuel Cell System>>

Figure 2:
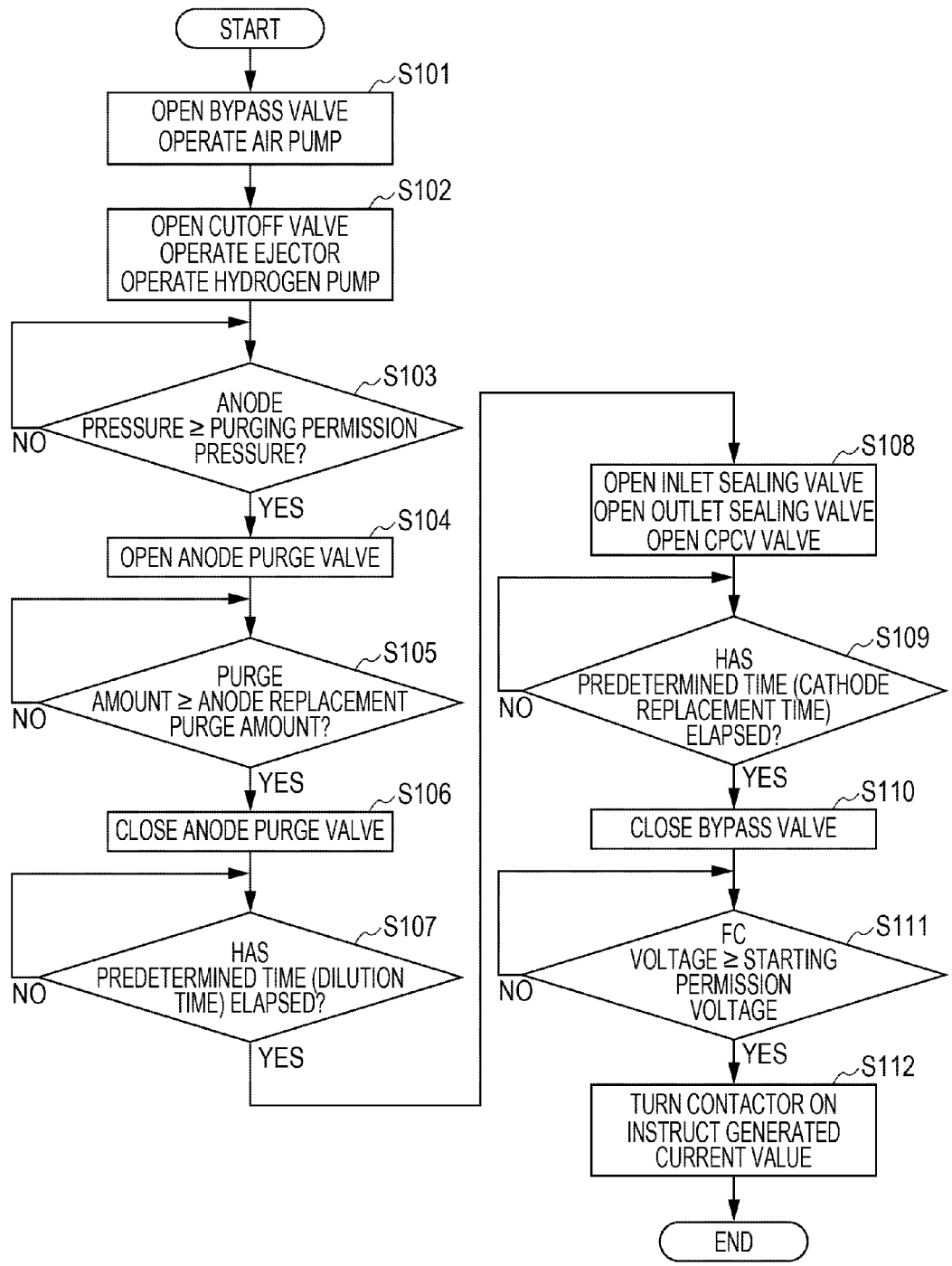
FIG. 2 is a flow chart of a starting process for a fuel cell system according to an embodiment of the present application.
Figure 3:
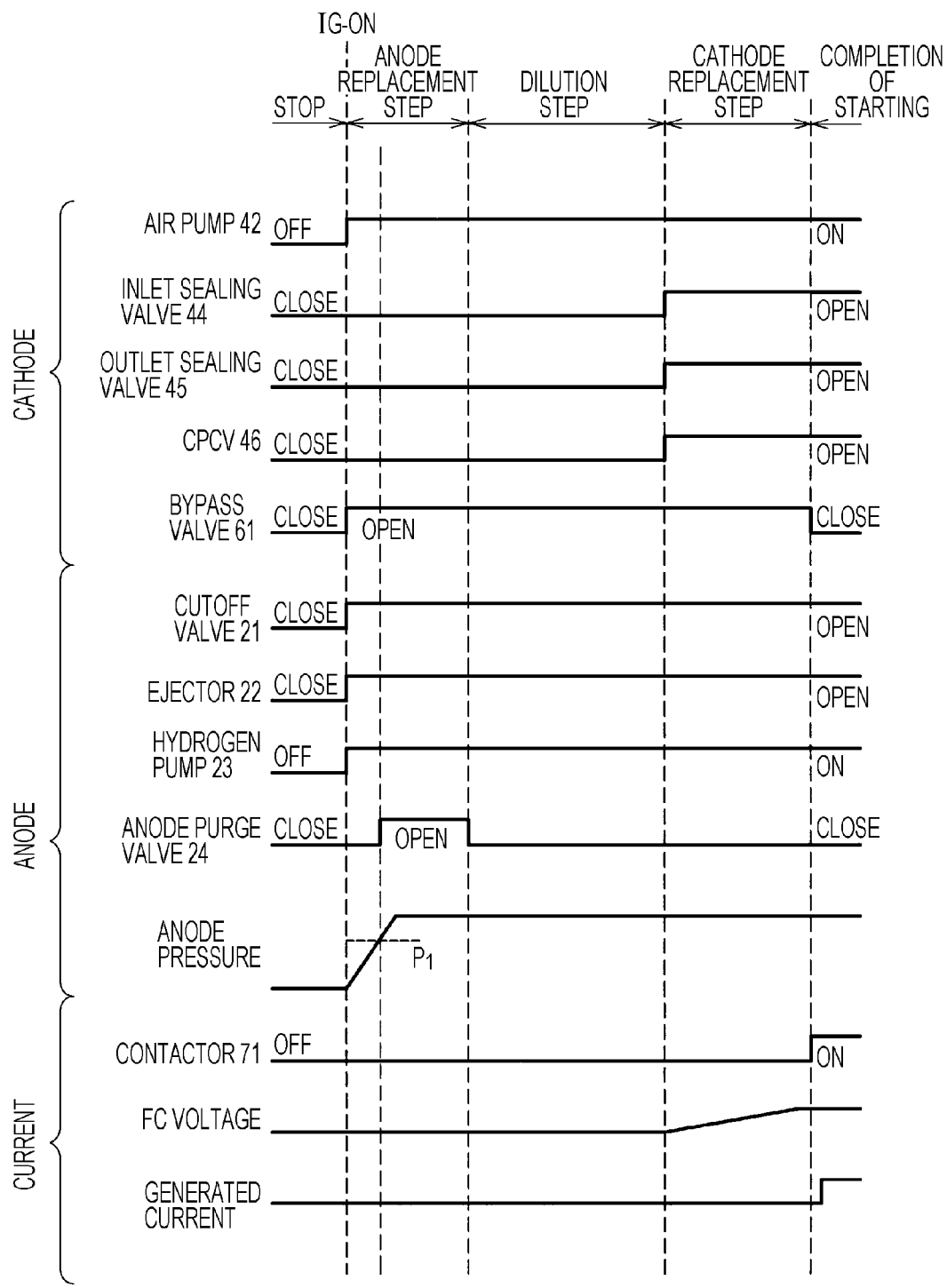
FIG. 3 is a time chart of a starting process for a fuel cell system according to an embodiment of the present application.

Next, the starting process for the fuel cell system S according to the embodiment is described with reference to FIGS. 2 and 3. FIG. 2 is a flow chart of the starting process for the fuel cell system S according to the embodiment of the present application. FIG. 3 is a time chart of the starting process for the fuel cell system according to the embodiment of the present application.

As shown in FIG. 3, the starting process for the fuel cell system S includes an anode replacement step (fuel gas replacement step) (Steps S101 to S105 in FIG. 2), a dilution step (Steps S106 and S107 in FIG. 2), and a cathode replacement step (oxidizer gas replacement step) (Steps S108 to S112 in FIG. 2), which are sequentially performed.

The starting process for the fuel cell system S executed by the ECU 80 is described using FIG. 2 with reference to FIG. 3.

During shutdown of the fuel cell system S, as shown in FIG. 3, the cutoff valve 21 and the anode purge valve 24 are closed, and the anode flow passage 10a of the fuel cell stack 10 is sealed and is filled with anode residual gas (for example, air). In addition, the inlet sealing valve 44 and the outlet sealing valve 45 are closed, and the cathode flow passage 10c of the fuel cell stack 10 is sealed and is filed with cathode residual gas (for example, air).

When detecting a command (IG-ON) to start the fuel cell system S, the ECU 80 starts the starting process shown in FIG. 2.

In Step S101, the RCU 80 opens the bypass valve 61 and operates the air pump 24.

Consequently, the oxidizer gas bypass passage is formed, and the air taken in from the intake 41 is supplied to the diluter 60 through the pipe 51a, the air pump 42, the pipe 51b, the pipe 62a, the bypass valve 61, the pipe 62b, and the pipe 52d.

The inlet sealing valve 44 and the outlet sealing valve 45 are closed so as to prevent the air pumped from the air pump 42 from flowing into the cathode flow passage 10c of the fuel cell stack 10.

In Step S102, the ECU 80 opens the cutoff valve 21 and operates the ejector 22 and the hydrogen pump 23.

Consequently, the fuel gas supply passage and the fuel exhaust gas recirculation passage are formed, and hydrogen supplied from the hydrogen tank (not shown) is supplied to the inlet of the anode flow passage 10a through the pipe 31a, the cutoff valve 21, the pipe 31b, the ejector 22, and the pipe 31c. In addition, the supplied hydrogen and the anode residual gas remaining in the anode flow passage 10a are circulated from the outlet of the anode flow passage 10a to the inlet of the anode flow passage 10a through the pipe 32a, the pipe 33, the ejector 22, and the pipe 31c. Also, these gases are circulated from the outlet of the anode flow passage 10a to the inlet of the anode flow passage 10a through the pipe 32a, the pipe 34a, the hydrogen pump 23, and the pipe 31c.

Since the anode purge valve 24 is closed, the gas pressure (anode pressure) in the anode flow passage 10a is increased by supplying hydrogen from the fuel gas supply passage (refer to FIG. 3).

In Step S103, the ECU 80 determines whether or not the pressure (anode pressure) detected by a pressure sensor (not shown), that detects the gas pressure in the anode flow passage 10a of the fuel cell stack 10, is equal to or higher than predetermined pressure (purging permission pressure $P_1$).

The purging permission pressure $P_1$ is a threshold of pressure at which the fuel exhaust gas in the anode flow passage 10a may be purged into the diluter 60 by opening the anode purge valve 24, and is previously determined.

When the anode pressure is equal to or higher than the purging permission pressure $P_1$ ("Yes" in Step S103), the processing of the ECU 80 advances to Step S104. When the anode pressure is not equal to or higher than the purging permission pressure $P_1$ ("No" in Step S103), the processing of the ECU 80 in Step S103 is repeated.

In Step S104, the ECU 80 opens the anode purge valve 24. Consequently, the fuel exhaust gas exhaust passage is formed, and the anode residual gas (e.g., air) is discharged to the diluter 60 together with hydrogen.

In the diluter 60, the hydrogen and the anode residual gas discharged from the pipe 32b (fuel exhaust gas exhaust passage) are diluted with air supplied from the pipe 52d (oxidizer gas bypass passage) and discharged to the outside.

In Step S105, the ECU 80 determines whether or not the purge amount of the fuel exhaust gas purged into the diluter 60 through the anode purge valve 24 is equal to more than a predetermined purge amount (anode replacement purge amount).

The anode replacement purge amount is a threshold value for determining that the anode residual gas is discharged from the anode flow passage 10a and replaced with hydrogen, and is previously determined.

The amount of the fuel exhaust gas purged may be detected by, for example, a flow sensor (not shown) provided on the pipe 32b or may be estimated from the valve opening elapsed time of the anode valve 24.

When the purge amount is equal to or more than the anode replacement purge amount ("Yes" in Step S105), the processing of the ECU 80 advances to Step S106. When the purge amount is not equal to or more than the anode replacement purge amount ("No" in Step S105), the processing of the ECU 80 in Step S105 is repeated.

In Step S106, the ECU 80 closes the anode purge valve 24. Consequently, the fuel exhaust gas exhaust passage is sealed, and discharge of the fuel exhaust gas into the diluter 60 is stopped. As described above, air is supplied to the diluter 60 through the oxidizer gas bypass passage (refer to S101).

In Step S107, the ECU 80 determines whether or not a predetermined time (dilution time) has elapsed from closing of the anode purge valve 24 (S106).

The predetermined time (dilution time) is a time required for diluting the hydrogen, which is purged together with the anode residual gas during Steps S104 to S106, with the air supplied through the oxidizer gas bypass passage and is previously determined.

When the predetermined time (dilution time) has elapsed ("Yes" in Step S107), the processing of the ECU 80 advances to Step S108. When the predetermined time (dilution time) has not elapsed ("No" in Step S107), the processing of the ECU 80 in Step S107 is repeated.

In Step S108, the ECU 80 opens the inlet sealing valve 44, the outlet sealing valve 45, and the CPCV 46. Consequently, the oxidizer gas supply passage and the oxidizer exhaust gas exhaust passage are formed, and the air taken in from the intake 41 is supplied to the inlet of the cathode flow passage 10c through the pipe 51a, the air pump 42, the pipe 51b, the humidifier 43, the pipe 51c, the inlet sealing valve 44, and the pipe 51d. Then, the supplied air and the cathode residual gas remaining in the cathode flow passage 10c etc. during shutdown are supplied to the diluter 60 from the outlet of the cathode flow passage 10c through the pipe 52a, the outlet sealing valve 45, the pipe 52b, the humidifier 43, the pipe 52c, the CPCV 46, and the pipe 52d.

In Step S109, the ECU 80 determines whether or not a predetermined time (cathode replacement time) has elapsed from opening of the inlet sealing valve 44, the outlet sealing valve 45, and the CPCV 46 (S108).

The predetermined time (cathode replacement time) is a threshold value for determining that the cathode residual gas is discharged from the cathode flow passage 10c and replaced with air, and is previously determined.

When the predetermined time (cathode replacement time) has elapsed ("Yes" in Step S109), the processing of the ECU 80 advances to Step S110. When the predetermined time (cathode replacement time) has not elapsed ("No" in Step S109), the processing of the ECU 80 in Step S109 is repeated.

In Step S110, the ECU 80 closes the bypass valve 61. Consequently, the oxidizer gas bypass passage is sealed. The hydrogen contained in the fuel exhaust gas purged from the fuel exhaust gas exhaust passage in a subsequent step is diluted with the oxidizer exhaust gas exhausted from the oxidizer exhaust gas exhaust passage.

In Step S111, the ECU 80 determines whether or not the total voltage (FC voltage) acquired from a voltage sensor (not shown), that detects the total voltage (FC voltage) of open-circuit voltage of the fuel cell stack 10, in the anode flow passage 10a of the fuel cell stack 10 is equal to or higher than a predetermined voltage (starting permission voltage).

The starting permission voltage is a threshold value for determining whether or not cathode replacement is sufficiently performed, and is previously determined. This is because when electric power is generated from the fuel cell stack 10 under a condition where oxygen is lacking due to insufficient cathode replacement, the catalyst may be degraded, thereby decreasing the life of the fuel cell stack 10.

When the FC voltage is equal to or higher than the starting permission voltage ("Yes" in Step S111), the processing of the ECU 80 advances to Step S112. When the FC voltage is not equal to or higher than the starting permission voltage ("No" in Step S111), the processing of the ECU 80 in Step S111 is repeated.

In Step S112, the ECU 80 turns on (connects) the contactor 71 (connection) and instructs a value of generated current. In this way, starting of the fuel cell system S is completed.

The above-described starting process for the fuel cell system S according to the embodiment is capable of suppressing deterioration of the catalyst and inhibiting a decrease in life of the fuel cell stack 10 as compared with a usual fuel cell system (for example, the fuel cell apparatus of Japanese Patent No. 4357836).

That is, when the fuel cell system S is started from a shutdown state of the fuel cell system S in which the anode flow passage 10a and the cathode flow passage 10c are filled with air, the fuel cell apparatus (fuel cell system) disclosed in Japanese Patent No. 4357836 may cause a hydrogen concentration gradient in a stack plane or in the stacking direction of the fuel cell stack 10 in the anode replacement step of replacing air (anode residual gas) in the anode flow passage 10a with hydrogen.

On the other hand, the fuel cell system S according to the embodiment is capable of decreasing a hydrogen concentration gradient in a stack plane or in the stacking direction of the fuel cell stack 10 because as shown in Step S102, the gas in the anode flow passage 10a is circulated by the hydrogen pump 23 while hydrogen is supplied to the anode flow passage 10a by opening the cutoff valve 21. Therefore, it is possible to suppress the occurrence of a corrosion current and deterioration in the catalyst and inhibit a decrease in life of the fuel cell stack 10.

In addition, the fuel cell system S according to the embodiment includes the oxidizer gas bypass passage (the pipes 62a and 62b) and the bypass valve 61 so that air is supplied to the diluter 60 while the cathode flow passage 10c is sealed in the anode replacement step (refer to Step S101). As a result, the hydrogen discharged together with the anode residual gas may be diluted and discharged from the diluter 60, thereby preventing an increase in hydrogen concentration in the exhaust gas discharged from the diluter 60 (fuel cell system S).

MODIFIED EXAMPLE

The fuel cell system S according to the embodiment is not limited to the configuration of the above-described embodiment, and various modifications may be made without deviating from the gist of the present application.

In the above-described embodiment, the anode residual gas which fills the anode flow passage 10a and the cathode residual gas which fills the cathode flow passage 10c during shutdown of the fuel cell system S are air, but the residual gases are limited to this. For example, the anode flow passage 10a and the cathode flow passage 10c may be filled with nitrogen gas (or air lacking of oxygen). The anode residual gas and the cathode residual gas may be different gases.

In a method for starting a fuel cell system according to the embodiment, the fuel cell system including a fuel cell that generates electric power by an electrochemical reaction between fuel gas supplied to the anode side and oxidizer gas supplied to the cathode side, a fuel gas supply passage and a fuel gas supply device that supply the fuel gas to the fuel cell, a fuel exhaust gas exhaust passage through which fuel exhaust gas is exhausted from the fuel cell, a fuel exhaust gas exhaust passage controller that controls an operating state of the fuel exhaust gas exhaust passage, a fuel exhaust gas recirculation passage through which the fuel exhaust gas is recirculated to the anode side of the fuel cell, a fuel exhaust gas recirculation passage controller that controls an operating state of the fuel exhaust gas recirculation passage, an oxidizer gas supply passage and an oxidizer gas supply device that supply the oxidizer gas to the fuel cell, an oxidizer exhaust gas exhaust passage through which oxidizer exhaust gas is exhausted from the fuel cell, an oxidizer gas bypass passage branched from the oxidizer gas supply passage and connected to the oxidizer exhaust gas exhaust passage while bypassing the fuel cell, an oxidizer gas bypass passage controller that controls an operating state of the oxidizer gas bypass passage, an oxidizer gas supply passage sealing device that seals the oxidizer gas supply passage downstream of the branch portion where the oxidizer gas bypass passage is branched from the oxidizer gas supply passage, an oxidizer exhaust gas exhaust passage sealing device that seals the oxidizer exhaust gas exhaust passage upstream of the connection portion where the oxidizer gas bypass passage is connected to the oxidizer exhaust gas exhaust passage, and a diluter that connects the downstream side of the fuel exhaust gas exhaust passage and the downstream side of the oxidizer exhaust gas exhaust passage, the method including a fuel gas replacement step of operating the oxidizer gas bypass passage by the oxidizer gas bypass passage controller to supply the oxidizer gas to the diluter from the oxidizer gas supply device under a condition where the oxidizer gas supply passage is sealed by the oxidizer gas supply passage sealing device and the oxidizer exhaust gas exhaust passage is sealed by the oxidizer exhaust gas exhaust passage sealing device, supplying the fuel gas to the fuel cell from the fuel gas supply device, operating the fuel exhaust gas recirculation passage by the fuel exhaust gas recirculation passage controller, and operating the fuel exhaust gas exhaust passage by the fuel exhaust gas exhaust passage controller to exhaust anode residual gas remaining on the anode side of the fuel cell into the diluter and replace the anode-side gas in the fuel cell with the fuel gas.

In this configuration of the embodiment, a concentration gradient of the fuel gas (hydrogen) may be decreased by operating the fuel exhaust gas recirculation passage by the fuel exhaust gas recirculation passage controller while supplying the fuel gas to the fuel cell from the fuel gas supply device. Therefore, it is possible to suppress deterioration in the catalyst and the catalyst support and inhibit a decrease in life of the fuel cell.

Also, the oxidizer gas may be supplied to the diluter from the oxidizer gas supply device by operating the oxidizer gas bypass passage by the oxidizer gas bypass passage controller, and thus the fuel gas exhausted together with the anode residual gas may be diluted by the diluter.

In addition, the method for starting the fuel cell system according to the embodiment preferably includes, after the fuel gas replacement step, a dilution step of sealing the fuel exhaust gas exhaust passage by the fuel exhaust gas exhaust passage controller and continuing the supply of the oxidizer gas to the diluter from the oxidizer gas supply device through the oxidizer gas bypass passage for a predetermined time.

In this configuration of the embodiment, the fuel gas exhausted together with the anode residual gas in the fuel gas replacement step may be securely diluted by the diluter.

In addition, the method for starting the fuel cell system according to the embodiment preferably includes, after the dilution step, an oxidizer gas replacement step of releasing the oxidizer gas supply passage from sealing by the oxidizer gas supply passage sealing device and releasing the oxidizer exhaust gas exhaust passage from sealing by the oxidizer exhaust gas exhaust passage sealing device to exhaust cathode residual gas remaining on the cathode side of the fuel cell and to replace the cathode-side gas in the fuel cell with the oxidizer gas.

In this configuration of the embodiment, the oxidizer gas replacement step may be performed after the fuel gas replacement step, and thus the cathode side may be sealed in the fuel gas replacement step. That is, in the fuel gas replacement step, the occurrence of a corrosion current may be suppressed by stopping the supply of the oxidizer gas to the cathode, thereby suppressing deterioration in the catalyst and the catalyst support and inhibiting a decrease in life of the fuel cell.

In addition, the method for starting the fuel cell system according to the embodiment preferably includes, after the oxidizer gas replacement step, stopping the oxidizer gas bypass passage by the oxidizer gas bypass passage controller.

In this configuration of the embodiment, the oxidizer gas bypass passage is stopped after the occurrence of a condition where the oxidizer exhaust gas is exhausted into the diluter from the oxidizer gas supply passage and the oxidizer exhaust gas exhaust passage, thereby preventing interruption of supply of the dilution medium (oxidizer gas/oxidizer exhaust gas) used for diluting the fuel gas by the diluter.

An apparatus for starting a fuel cell system according to the embodiment includes a unit that operates an oxidizer gas supply passage sealing device to seal an oxidizer gas supply passage, through which an oxidizer gas is supplied to a fuel cell, and operates an oxidizer exhaust gas exhaust passage sealing device to seal an oxidizer exhaust gas passage through which the oxidizer gas is exhausted from the fuel cell; a unit that, in the sealed state, operates an oxidizer gas bypass passage controller to supply the oxidizer gas to a diluter from an oxidizer gas supply device through an oxidizer gas bypass passage branched from the oxidizer gas supply passage and connected to the oxidizer exhaust gas exhaust passage while bypassing the fuel cell; a unit that operates a fuel gas supply device to supply a fuel gas to the fuel cell and operates a fuel exhaust gas recirculation passage controller to supply a fuel exhaust gas exhausted from the fuel cell through a fuel exhaust gas exhaust passage to the fuel cell through a fuel exhaust gas recirculation passage; and a unit that operates a fuel exhaust gas exhaust passage controller to exhaust an anode residual gas containing the fuel gas and remaining on the anode side of the fuel cell to the diluter through the fuel exhaust gas exhaust passage and to replace the anode-side gas in the fuel cell with the fuel gas.

In this configuration of the embodiment, a concentration gradient of the fuel gas (hydrogen) may be decreased by operating the fuel exhaust gas recirculation passage by the fuel exhaust gas recirculation passage controller while supplying the fuel gas to the fuel cell from the fuel gas supply device. Therefore, it is possible to suppress deterioration in the catalyst and the catalyst support and inhibit a decrease in life of the fuel cell.

Also, the oxidizer gas may be supplied to the diluter from the oxidizer gas supply device by operating the oxidizer gas bypass passage by the oxidizer gas bypass passage controller, and thus the fuel gas exhausted together with the anode residual gas may be diluted by the diluter.

According to the embodiment, a method and apparatus for starting a fuel cell system capable of suppressing deterioration in a fuel cell may be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A method for starting a fuel cell system, the method comprising:

operating an oxidizer gas bypass passage by an oxidizer gas bypass passage controller to supply oxidizer gas to a diluter from an oxidizer gas supply device under a condition where an oxidizer gas supply passage is sealed by an oxidizer gas supply passage sealing device and an oxidizer exhaust gas exhaust passage is sealed by an oxidizer exhaust gas exhaust passage sealing device, the oxidizer gas bypass passage being branched from the oxidizer gas supply passage and connected to the oxidizer exhaust gas exhaust passage to bypass a fuel cell, the fuel cell being provided to generate electric power by an electrochemical reaction between fuel gas supplied to an anode side and oxidizer gas supplied to a cathode side, the oxidizer gas supply device being provided to supply the oxidizer gas to the fuel cell through an oxidizer gas supply passage, the oxidizer gas bypass passage controller being configured to control an operating state of the oxidizer gas bypass passage, the oxidizer gas supply passage sealing device being provided to seal the oxidizer gas supply passage downstream of a branch portion where the oxidizer gas bypass passage is branched from the oxidizer gas supply passage, the oxidizer exhaust gas exhaust passage sealing device being provided to seal the oxidizer exhaust gas exhaust passage upstream of a connection portion where the oxidizer gas bypass passage is connected to the oxidizer exhaust gas exhaust passage, the diluter being provided to connect a downstream side of a fuel exhaust gas exhaust passage to a downstream side of the oxidizer exhaust gas exhaust passage;

operating a fuel exhaust gas recirculation passage by a fuel exhaust gas recirculation passage controller to supply fuel gas to the fuel cell from a fuel gas supply device, the fuel exhaust gas recirculation passage controller being configured to control an operating state of the fuel exhaust gas recirculation passage, the fuel gas supply device being provided to supply the fuel gas to the fuel cell through the fuel gas supply passage;

operating a fuel exhaust gas exhaust passage by a fuel exhaust gas exhaust passage controller to exhaust an anode residual gas remaining on the anode side of the fuel cell into the diluter and to replace anode-side gas in the fuel cell with the fuel gas by opening a fuel exhaust gas exhaust passage sealing device after the fuel exhaust gas recirculation passage is operated, the fuel exhaust gas exhaust passage controller being configured to control an operating state of the fuel exhaust gas exhaust passage through which fuel exhaust gas is to be exhausted from the fuel cell, and sealing the fuel exhaust gas exhaust passage by the fuel exhaust gas exhaust passage controller after the operating of the fuel exhaust gas exhaust passage.

2. The method according to claim 1, further comprising:
continuing supply of the oxidizer gas to the diluter from the oxidizer gas supply device through the oxidizer gas bypass passage for a predetermined time after the sealing, of the fuel exhaust gas exhaust passage.

3. The method according to claim 2, further comprising:
releasing, after the continuing of the supply of the oxidizer gas, the oxidizer gas supply passage and the oxidizer exhaust gas exhaust passage from sealing by the oxidizer gas supply passage sealing device and from sealing by the oxidizer exhaust gas exhaust passage sealing device to exhaust a cathode residual gas remaining on the cathode side of the fuel cell and to replace the cathode-side gas in the fuel cell with the oxidizer gas.

4. The method according to claim 3, further comprising:
sealing the oxidizer gas bypass passage by the oxidizer gas bypass passage controller after the releasing of the oxidizer gas supply passage.

5. The method according to claim 1, wherein the operating of the fuel exhaust gas exhaust passage includes operating the fuel exhaust gas exhaust passage by the fuel exhaust gas exhaust passage controller to exhaust the anode residual gas if a pressure in the anode side of the fuel cell is equal to or higher than a predetermined pressure.

6. The method according to claim 5, further comprising:

sealing the fuel exhaust gas exhaust passage by the fuel exhaust gas exhaust passage controller if an amount of the anode residual gas exhausted into the diluter is equal to or greater than a predetermined purge amount after the operating of the fuel exhaust gas exhaust passage.

7. The method according to claim 1, wherein the fuel exhaust gas exhaust passage sealing device is opened when a pressure in the anode side of the fuel cell is equal to or higher than a predetermined pressure.

8. The method according to claim 1, further comprising continuing supply of the oxidizer gas to the diluter from the oxidizer gas supply device through the oxidizer gas bypass passage for a predetermined time after the sealing of the fuel exhaust gas exhaust passage under the condition where the oxidizer gas supply passage is sealed by the oxidizer gas supply passage sealing device and the oxidizer exhaust gas exhaust passage is sealed by the oxidizer exhaust gas exhaust passage sealing device.

9. The method according to claim 8, further comprising opening the oxidizer gas supply passage and the oxidizer exhaust gas exhaust passage after the predetermined time.

* * * * *